United States Patent [19]
Miller, Jr.

[11] 4,054,257
[45] Oct. 18, 1977

[54] ICE SLED

[76] Inventor: Warren Christie Miller, Jr., 412 Southampton Drive, Silver Spring, Md. 20903

[21] Appl. No.: 676,580

[22] Filed: Apr. 13, 1976

[51] Int. Cl.² .............................................. B28B 7/16
[52] U.S. Cl. .................................... 249/97; 249/176; 425/DIG. 57
[58] Field of Search ........................ 264/28; 280/12 B; 249/121, 149, DIG. 1, DIG. 2, 117, 120, 165, 176, 97; 425/DIG. 57

[56] References Cited
U.S. PATENT DOCUMENTS 2,071,845  2/1937  Kowalski ........................ 249/121 X
2,087,912  7/1937  Horlebeck ...................... 249/121 X
3,385,205  5/1968  McCloud ......................... 249/149 X
3,684,235  8/1972  Schupbach ...................... 249/127

*Primary Examiner*—Francis S. Husar
*Assistant Examiner*—John S. Brown

[57] ABSTRACT

Disclosed is a form to be filled with water which in turn is being frozen and when separated from the form represents an Ice Sled to be used by children on grassy hills during the summer. The form consists of a boat like bottom which is to be filled with water and a cover which has downward depressions which are submerged into the water level to thereby form foot rests and a seat after the water is frozen.

7 Claims, 11 Drawing Figures

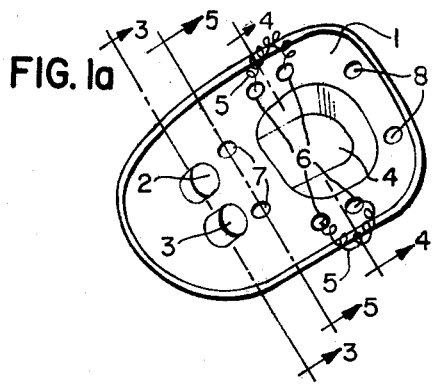
FIG. 1a
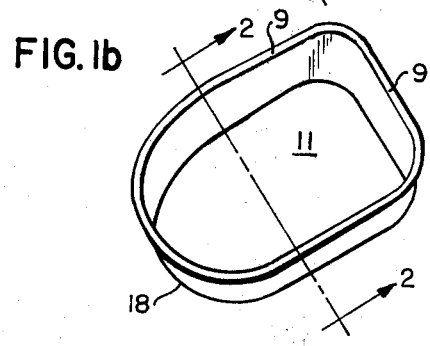
FIG. 1b
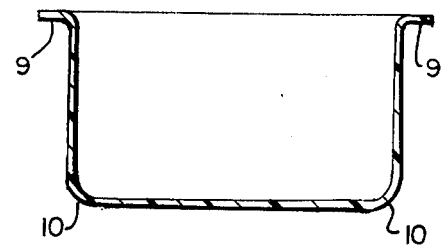
FIG. 2
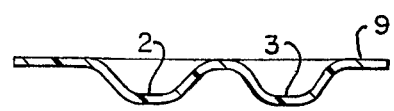
FIG. 3
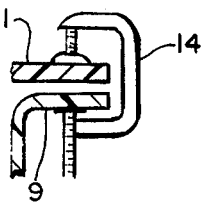
FIG. 6
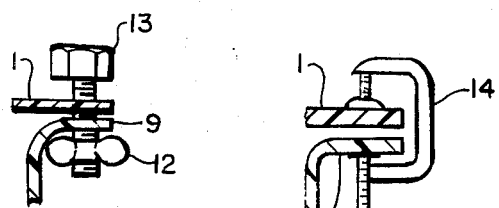
FIG. 7
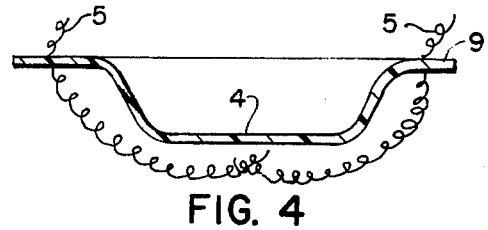
FIG. 4
FIG. 5
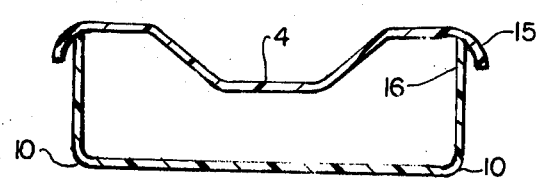
FIG. 8a
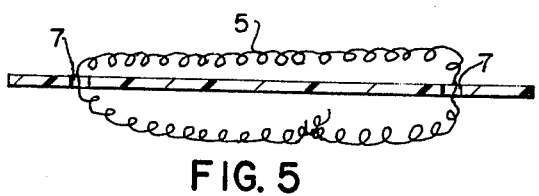
FIG. 8b
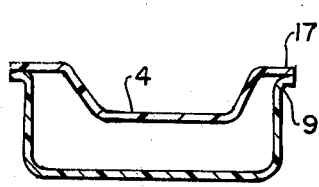
FIG. 8c

ICE SLED

BACKGROUND OF THE INVENTION

A casual and general observation of children and their activities during the hot and humid days in the summertime will force one to the conclusion that they do not have enough exercise mostly because hot and humid days induce such inactivity.

The invention disclosed herein is believed to eleviate such inactivity to a great extent because it is an extension of an activity enjoyed by so many children during the wintertime, namely sledding. It has been found that a block of ice can be used as a means for sledding on a grassy hill. This is so, because a film of water on the block of ice acts as a lubricant on the grass in a similar manner as, for example, does a film of water on the snow or ice on the ground against the runners of a sled. Thereby, besides the fun of sledding, children also receive somewhat of a cooling during hot summertime because they are playing with and sitting on top of ice when riding the same downhill.

SUMMARY OF THE INVENTION

Because of the above realization it is an object of this invention to develop a sled made of ice. Various tests have proven that one needs more than just a block of ice to fully realize the full enjoyment of the invention but also a safe use of the same. For directional stability, for example, the front of the block should be shaped in a tapering direction similar to that of a boat. Furthermore, the front of the block should be sloped upwardly as that the ice cannot dig into grass plugs and can easily overcome unevenness of the ground.

For safety reasons, the top of the block has depressions so as to represent a seat and foot rests so that the feet cannot slide off. Additionally, there sould be some kind of handle means for the user to hang on to when using the sled.

It is difficult or almost impossible to fashion such a sled from a block of ice and, therefore, a form has been developed to shape the sled described above to the desired practical and safe shape.

The form consists of a bottom similar to that of a boat and a cover. The cover has either one or two smaller depressions and one larger one. In use, the bottom will be filled with water and when the top is secured to the bottom, the depression will displace water and after the water has been frozen and the ice is removed from the form, the depressions are left in the ice. The one or two smaller depressions are to receive the feet of the user and the larger depression serves as a seat for the user.

A further object is to provide handle means for the safety of a user which could be ropes passed through apertures in the cover and dangled into the water while in the process of being frozen. The ends of the ropes could exhibit knots for secure anchorage in the ice or could be continuous loops. There should be two handles with one handle on each side of the user.

Lastly, there should be means for securing the cover to the bottom while the water is in the process of being frozen. To this end, the bottom is provided with a laterally extending flange to which the cover is being secured by either clamps, clips or threaded fasteners passing through the cover and the flange. In another embodiment the bottom flange could be a reverse flange capable of receiving an edge of the cover.

In practice, the mold is of a size to fit into the freezer compartment of an ordinary standard size family refrigerator and tests have shown that a block of ice lasts up to two hours in use on a 90° F day. It has further been established that the form as described above not only serves as a mold for forming the ice but also serves as a container while transporting the block of ice to the site of its ultimate use unless such site is in the backyard of the user or at least nearby whereby the mold can be reused immediately to freeze water again ready to be used after the prior block has thawed or melted enough so as to be replaced by a fresh one.

BRIEF DESCRIPTION OF THE DRAWINGS

FIGS. 1a to 1b represent perspective views of the cover and bottom, respectively.

FIG. 2 is a cross section along lines 2—2 of FIG. 1b.

FIG. 3 is a cross section taken along line 3—3 of FIG. 1a.

FIG. 4 is a cross section of the cover taken along line 4—4 of FIG. 4a.

FIG. 5 is a cross section of the cover taken along the line 5 — 5 of FIG. 1a including the showing of a rope as handle means.

FIGS. 6 and 7 represent various fastening means of the cover to the flange of the bottom.

FIGS. 8a and 8c show various forms of the cover edge and the flange of the bottom.

FIGS. 8b represents a flange of the bottom with a reverse bend to receive the edge of the cover.

DETAILED DESCRIPTION OF THE DRAWINGS

In FIG. 1a, the numeral 1 represents the cover of the mold with 2 and 3 showing the depressions which in the frozen water serve to receive the feet of a user. Obviously, the two depressions, 2 and 3, could be one larger depression to receive both feet at the same time. 4 represents a depression in the cover to eventionally form a seat for the user in the frozen water. Such depression could be sloped inwardly from the forward direction of the form for reasons of comfortability. 5 represents handle means which are passed through apertures 6 in cover 1 of the mold so as to pass into the water when in the process of being frozen. 7 and 8 represent various other apertures in the cover to receive handle means to be used either for or aft of the user or both.

In FIG. 1b, 9 represents a lateral flange formed in the bottom of the mold. It is pointed out that like elements are represented by like reference characters in other FIGS. also. 11 in FIG. 1b represents the floor or bottom panel of the bottom of the mold.

Continuing in the description of FIGS. 6 and 7, there are shown various fastening means of the cover 1 to the flange 9 of the bottom such as a nut 12 and bolt 13 fastener of FIG. 6 or a clamp 14 of FIG. 7, for example.

FIGS. 8a and 8c show other cover and flange of bottom combinations in that in FIG. 8a, 15 shows a bent down flange covering a straight wall 16 of the bottom or lateral flanges 9 of the bottom and 17 of the cover are complimentary to each other.

In FIG. 8b there is shown a reverse bend 18, reverse to the flange 9 of the bottom so as to present a sort of receptacle 19 for the edge 20 of the cover 1. The numeral 10 in most FIGS. represents a bevel in the edges of the mold and of course ultimately in the frozen body of the water with the edge 18 in FIG. 1b sloping more steeply for reasons advanced above.

In operation, the mold of FIG. 1b is filled with water and the cover of FIG. 1a is secured to the flanges 9 of the bottom by fastening means shown in FIGS. 6 or 7 or various other fastening means known in the art. Furthermore, ropes are passed through the apertures 6, 7 or 8 of FIG. 1 either in continuous or discontinuous forms to eventually represent handle means. The mold thus completed is placed in the freezer compartment of a refrigerator and when the water is frozen solid, the resulting sled is ready for use. Lastly, it should be pointed out that it is preferred to cover the seating depression 4 with some kind of a fabrick or foamed polyurethane to prevent the user from contacting the ice directly to prevent an ice burn.

Top piece FIG. 1a kept intact will act as sufficient surface for the sledder to be protected from discomfort of cold, wet ice if formed from a polyethylene, ABS, or polystyrene plastic material. Future tests may use an injection rather than vacuum form mold process which will allow a rigid handle formation to extend from the top of the mold as opposed to the looped ropes.

It is obvious that various modifications are possible within the scope of the invention without departing from what is being claimed.

I claim:

1. A mold for forming an ice sled when filled with water to be frozen, said mold comprising a bottom forming a single compartment receptacle and a cover therefore, said cover further comprising a sheet of material covering said receptacle entirely and further comprising forward depressions and a rear depression, said cover having apertures receiving handle means passing therethrough and into the water, and means for fastening said cover to said bottom, whereby when said bottom is filled with water and said cover is fastened to said bottom, the depressions in said cover form feet and seat receptacle means, respectively, when said water is frozen.

2. The mold of claim 1, wherein the bottom has upright walls and a flange extending laterally therefrom, said cover being fastened to said flange.

3. The mold of claim 2, wherein said fastening means are bolt and nut means passing through apertures in said cover and flange.

4. The mold of claim 2, wherein the fastening means are clamp means.

5. The mold of claim 1, wherein the edges of said bottom are bevelled.

6. The mold of claim 1, wherein the forward leading edge of said mold is curved upwardly from the bottom of said receptacle to the top of the same.

7. The mold of claim 1, wherein the handle means is a rope means passed to within the receptacle.

* * * * *